March 18, 1969

F. H. BRAME ET AL 3,433,439

SECTIONAL ARTICULATED FUSELAGE FOREBODY FOR HIGH-SPEED AIRCRAFT

Filed May 22, 1967

INVENTORS
FRANK H. BRAME
CHARLES B. FISHER
BY

ATTORNEYS

INVENTORS
FRANK H. BRAME
CHARLES B. FISHER
BY
ATTORNEYS

INVENTORS
FRANK H. BRAME
CHARLES B. FISHER
BY
Christensen, Sanborn & Matthews
ATTORNEYS

United States Patent Office 3,433,439
Patented Mar. 18, 1969

3,433,439
SECTIONAL ARTICULATED FUSELAGE FORE-
BODY FOR HIGH-SPEED AIRCRAFT
Frank H. Brame, Redmond, and Charles B. Fisher,
Seattle, Wash., assignors to The Boeing Company,
Seattle, Wash., a corporation of Delaware
Filed May 22, 1967, Ser. No. 640,269
U.S. Cl. 244—120                    14 Claims
Int. Cl. B64c 1/00, 1/28; B64d 11/00

ABSTRACT OF THE DISCLOSURE

The fuselage nose or forebody of a high-speed aircraft according to this invention is of sectional articulated construction, in the cruise condition of which the nose sections combine with the fuselage proper so as to minimize wave and trim drag, whereas in the subsonic flight, landing and takeoff condition the nose is depressed below its cruise position and changed in configuration by relative movement of the sections in order primarily to increase the pilot's clear field of vision in the critical section lying below and ahead of the aircraft. With linkage mechanism coordinating relative angular movements of the nose sections the tip section is maintained substantially parallel at all times to its position in cruise, so that direction-referenced instrumentation such as pitot-static devices, radar, etc. carried by the tip section remain operative in the same manner during landing and takeoff phases as in cruise, without necessity for enlarged radar windows, expanded-range radar base stabilization systems, or means to convert instrument data so as to allow for change of attitude. Such paralleling movement of the tip section also minimizes disturbance of aircraft trim during nose conversion movements and reduces the required height of the front landing gear carriage in order for the nose when depressed to safely clear ground objects such as fences snow banks and service vehicles.

---

This invention relates to high-speed aircraft and more particularly supersonic aircraft fuselage arrangements in which the inherent configuration requirements for efficient supersonic flight impose restrictions on pilot visibility which must be alleviated for subsonic flight, safe landing and takeoff operations. The invention is herein illustratively described by reference to its presently preferred embodiments; however, it will be recognized that certain modifications and changes therein with respect to details may be made without departing from the essential features involved. It will also be understood that while the invention is considered to have its most important application in the case of supersonic aircraft, certain benefits thereof may also be gained in high-speed subsonic aircraft of comparable design limitations.

In order to minimize wave and trim drag in supersonic flight the narrow forward taper of the fuselage forebody extends uninterruptedly from a station of major cross section to the nose tip, and thereby preempts such a major fraction of total fuselage length as to include the practical locations for the cockpit. Its tip section forward of the cockpit and control stations is required to carry various information-gathering and control devices such as one or more pitot-static tubes projecting forwardly into the free air-stream, radar for detecting weather conditions ahead and other purposes, satellite communications antenna means, etc., most of which are directionally referenced in their operation to the fuselage axis. Accordingly, the tip section thus occupied by apparatus inevitably obstructs direct forward-downward visibility for the pilot, whose only outlook is through side and top windows set flush with the skin. While adequate for cruise flight in the relatively unoccupied high reaches at which supersonic flight normally occurs, the pilot's field of view into the sector lying below and directly ahead of the aircraft critical for landing and takeoff operations and for flight in high-density subsonic regimes is largely obstructed.

As a result of this visibility problem, it was proposed heretofore to swing the nose downward on the fuselage or to shift portions thereof out of view-obstructing position when permitted aerodynamically by reduction of airspeed, such as when making a landing approach or taking off. However, prior proposals for configurational conversions of this nature have not been considered fully practicable due to a variety of problems identified with mechanization of those concepts. Some of these problems include that of maintaining adequate ground clearance for the depressed nose with undercarriage struts of reasonable length, undue drag and disturbance of aircraft trim when moving the nose structure while in flight, reorientation of the normal operation axes of directionally referenced nose instruments, mechanical complications, and others.

Accordingly, it is an object of this invention to overcome these difficulties and limitations in a high-speed aircraft employing a fuselage nose which is depressed below its cruise position in order thereby to open up the pilot's field of view in the critical sector for landing and takeoff operations.

A specific object hereof in such aircraft is to provide a depressible fuselage nose structure permitting use of a relatively short front landing gear strut without incurring problems of ground clearance.

Another important object is to provide such a system in which movement of the nose assembly between its high-speed and low-speed flight positions is permitted without complicating radar antenna stabilization requirements or increasing radar antenna sweep volume and transmission window area requirements.

Still another object is to provide such a movable-nose system achieving the aforementioned objectives and which may be actuated between positions without changing the orientation attitude of nose-mounted pitot-static sensing elements.

A further important object hereof is to devise a fuselage forebody configurational conversion system which is mechanically simple, reliable and fail-safe in its operation.

It is a further object hereof to device a drop-nose low-speed flight configuration for high-speed aircraft, so constituted as to serve effectively during landings as an energy absorbing skid which will safely support the nose and protect the fuselage proper from landing damage in the event of a forward landing carriage failure.

Still another important object hereof is to device a convertible drop-nose fuselage forebody configuration for the described purposes which will impose minimum trim drag penalty in the low-speed flight position, and which in the process of moving it between high-speed and low-speed positions will vary the component of pitching moment contributed by the fuselage only to a minimum extent.

With the foregoing and related objects and purposes in view, features of the invention reside in longitudinally sectionalizing the fuselage, pivotally interconnecting the sections and mechanically coordinating articulative movement of the sections relative to each other so that the tip section of the fuselage nose in its depressed or low-speed flight position will be disposed substantially parallel to the position which it occupies during cruise, and so that the one or more sections aft thereof will remain adequately faired together for low-speed flight. By thus effecting upward angular movement of the tip section relative to the nose section connecting it with the main fuselage section aft thereof as such connecting section is being depressed for landing purposes, preferably maintaining the tip section axis substantially parallel with its original axis throughout the motion, instrument devices carried by the nose remain substantially unaffected by such motion. Provision of suitable framing and abrasion resistant elements in the under portions of one or more of the depressible nose sections enables the nose to function effectively as an energy-absorbing skid, protecting the rest of the aircraft if necessary in case of a forward landing gear failure.

Additional features reside in mechanical linkages and actuators and in related configurational arrangements implementing the multiple-section articulated fuselage construction. The invention has still other aspects in its applicability to modified fuselage arrangements, especially as pertains to cockpit location, pilot's viewing window positions, and combinations thereof in their positional relationship to the nose sections.

These and other features, objects and advantages of the invention will become more fully evident from the following description thereof by reference to the accompanying drawings.

Referring to FIGURES 1-6 inclusive, the supersonic aircraft therein illustrated comprises an elongated fuselage 10 of articulated construction equipped with front and rear retractable landing carriages 12 and 14, respectively. The fuselage is suitably configured in the cruise position of its parts, including its forwardly tapered articulated nose 16, to move efficiently in supersonic flight, with minimum wave and trim drag. Here, as in the typical supersonic body, fuselage forward taper commences at its station of maximal cross section (S) and continues uninterruptedly to the tip 16a of the nose 16. A forwardly projecting pitot-static tube 18 mounted on the nose tip is disposed in the free stream with its axis approximately aligned, or parallel with, the fuselage axis A—A (or, more exactly, with the cruise streamlines).

Figures 1, 2:
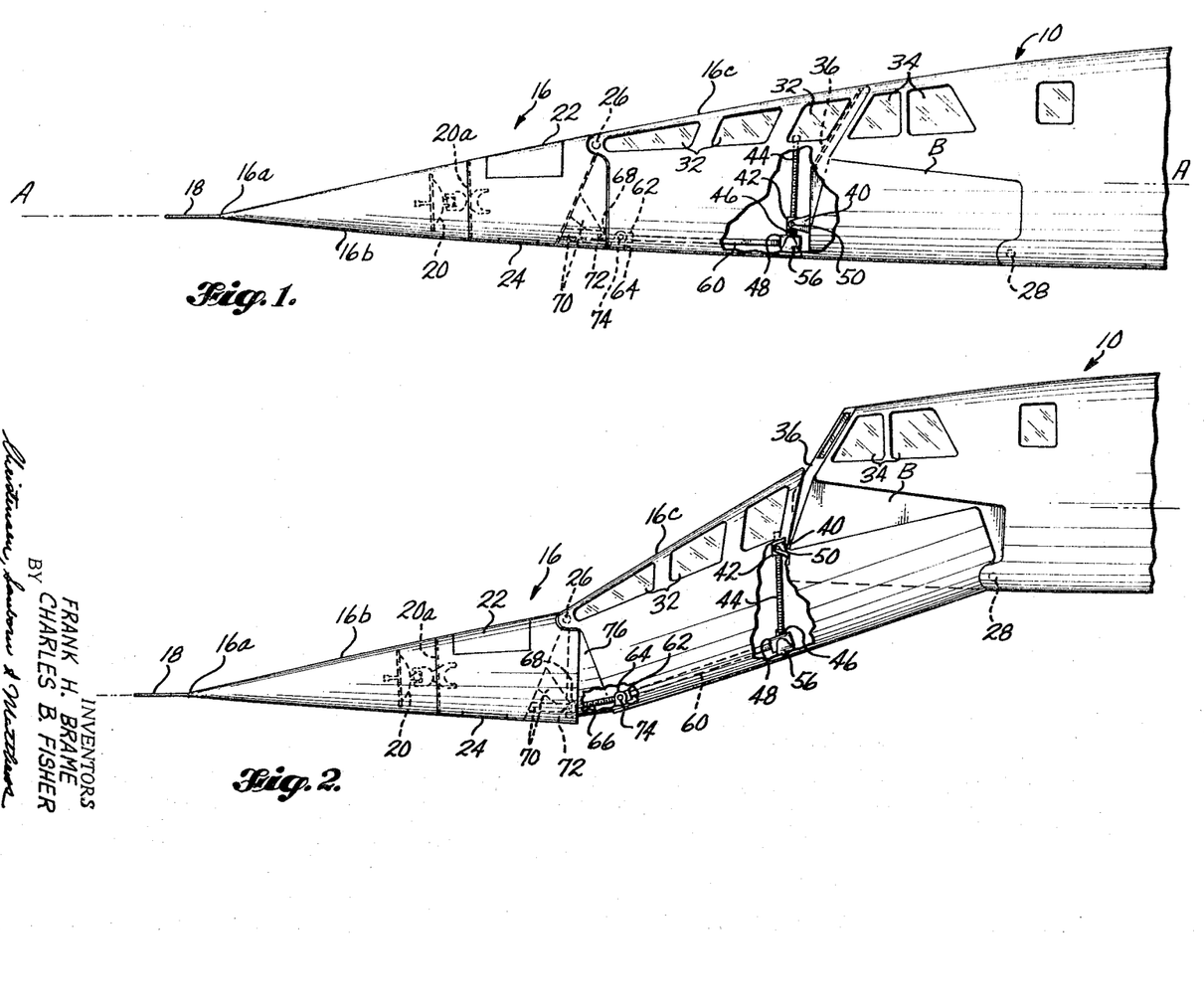
FIGURE 1 is a simplified side view of a supersonic aircraft fuselage forward portion incorporating the invention in one form, with the nose sections in cruise position.
FIGURE 2 is a view similar to FIGURE 1 with the nose sections depressed into the low-speed flight position, into which they are moved for landing and takeoff purposes.
Figure 3:
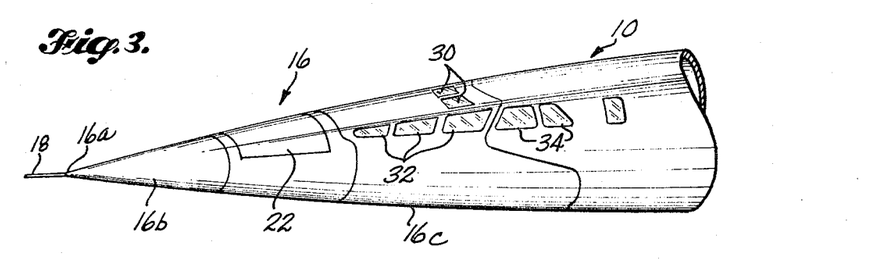
FIGURES 3 and 4 are isometric views from a forward aspect above the aircraft, illustrating the forebody arrangements of FIGURES 1 and 2 respectively.
Figure 4:
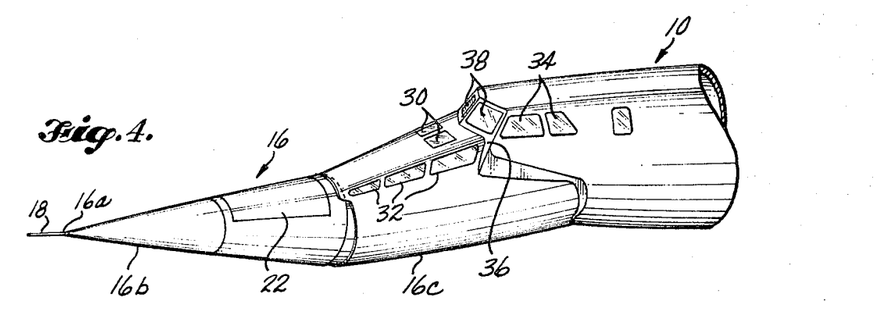

Fuselage nose 16 comprises a forward nose tip section 16b of approximately conical form and an adjoining aft nose base or connecting section 16c of approximately frusto-conical form joined in turn to the forward end of the main section of the fuselage 10. The forward portion of tip section 16b comprises a transmission window or radome 16b' for the radar 20 mounted therein on a transverse bulkhead 20a to detect weather conditions ahead and provide other data, with the reference axis of the radar established in predetermined relationship with the aircraft axis A—A. Also mounted in the tip section 16b, there may be various other antennas for different radar, communications or navigation purposes. For example one may be situated below the transmission window 22 flush with the top wall of the tip section 16b, and a marker beacon antenna (not shown) operating downwardly through a transmission window 24 flush with the bottom wall of the tip section 16b.

Tip section 16b is hingedly joined to nose section 16c so as to pivot in relation thereto on a transverse horizontal pivot axis 26 located near the top of each. Connecting section 16c in turn is hingedly joined near its aft lower corner to the fuselage main section 10 to pivot in relation thereto about a transverse horizontal axis 28. This main nose pivot axis 28 is located behind the cockpit or pilot's station designated B and at a low position in relation to the fuselage structure 10. This location is chosen so as to provide clearance of parts, particularly of nose section 16b's aft upper bulkhead parts in relation to the frame of the cockpit's forwardly facing windows 38 when the nose is being moved between its cruise position and its depressed or landing position, as will become more fully evident as the description proceeds. From the geometry involved it will be seen that the main window 38 are made to slope aft for streamlining purposes, generally the lower and farther back should the main pivot 28, or special design provisions made, such as shifting of pivot 28 fore and aft as necessary to provide the necessary clearance.

Visibility for the pilot seated approximately at station B is provided in cruise through forwardly sloping top wall windows 30 and forwardly and laterally sloping side wall windows 32 in the nose section 16c, and through the cockpit or cabin side windows 34. A front wall or bulkhead 36 extending across the front of the cockpit or control cabin closes the front end of the main section of fuselage 10 except for the necessary structural elements, seals, operating connections, control cables, wires and other elements, related to the support and operation of the nose system. Forwardly facing cockpit windows 38 set into the bulkhead 36 permit the pilot to look through the nose windows 30 and 32 during cruise. The windows 38 are set in generally transverse planes oblique to the axis A—A and with their upper and outboard edges offset aft from their lower and inboard edges, respectively, so as to reduce wind load when the nose is depressed from its cruise position shown in FIGURES 1 and 3 to its landing or takeoff or subsonic flight positions shown in FIGURES 2 and 4. By depressing the nose in this manner through the double articulating hinge action of the fuselage sections (16b, 16c and the main section of fuselage 10), the pilot's direct forward-downward field of view through the windows 38 is greatly increased for a safe landing even though in an emergency should the nose fail to depress landing is still possible with the view only as afforded through windows 30 and 32.

Figure 5:
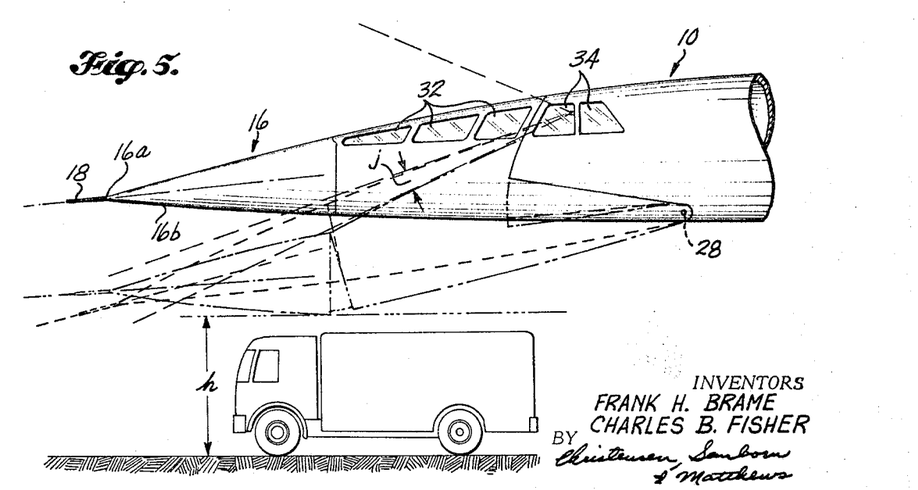
FIGURE 5 depicts the comparative effect on field of view for the pilot of depressing the nose in the arrangement comprising this invention and in a former arrangement considered to be most nearly like it.
Figure 6:
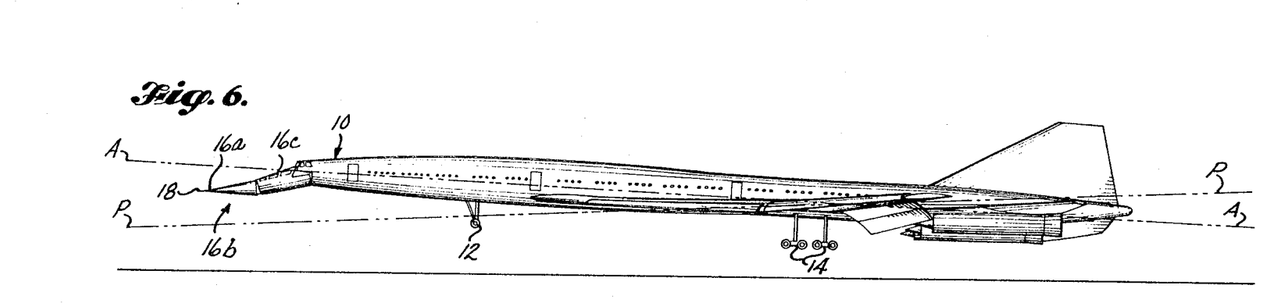
FIGURE 6 depicts a supersonic transport airplane making a landing approach making use of the present invention.

Referring to FIGURE 5, it will be seen that for the same ground clearance height $h$ of the lowest physical element on the depressed nose of the aircraft when landed the pilot's forward view downward through windshield 38 is materially increased (approximately by angle $j$) with the articulated nose construction characterizing this invention over what it would be with a non-articulated nose depressed to increase the field of view. Moreover, with the articulated nose in accordance with this invention the pilot-static tube 18, radar 20 and any other instruments directionally referenced to the aircraft axis A—A are permitted to retain their calibration in the depressed low-speed flight position of the nose as in the cruise position without necessity for modifying the signals or other data obtained from these devices nor for providing complex compensating mounts which will shift their operating reference position as a function of downward displacement of the tip section 16b supporting them. Moreover, in the case of the radar and other electromagnetic wave energy devices the transmission window areas can be made of minimum size to accommodate the full angular span requirement for unrestricted radiation transmission through them.

Controlled movement of nose sections 16b and 16c in relation to each other and to the main section of fuselage 10 in the embodiment shown in FIGURES 1 and 2 is accomplished by one or more linkage mechanisms including the pivotal connections 26 and 28 defining the main hinge supports interconnecting the sections. Each such linkage mechanism includes a stationary bracket 40 mounted in forwardly projecting position on fuselage bulkhead 36 to carry a threaded nut unit 42 engaging the threaded jack screw 44 projecting generally vertically through the nut and having its lower end connected to be driven through a universal coupling 46 by the reversible power drive unit 48. The drive unit is stationarily mounted on bracket 56 fixed to the bottom structure of nose section 16c and is suitably controlled from the cockpit. The nut unit 42 is pivotally mounted on the bracket 40 to pivot on a transverse horizontal axis 50. The universal joint connection 46 permits the screw 44 to be rotated in either direction and to swing in relation to the drive unit 48 while remaining connected to the latter to be driven in rotation as nose section 16c swings about main pivot axis 28. The electric motor or other power source situated in or operatively connected to the drive unit 48 is omitted from the drawing for the sake of simplicity.

The drive shaft 60 likewise reversibly driven by the drive unit 48 projects forwardly therefrom along the bottom of nose section 16c, through a universal coupling and support bearing 62 mounted in stationary bracket 64. The opposite side of this universal coupling is drivingly connected to a jack screw 66 engaging a nut 68 mounted on brackets 70 to pivot on a horizontal transverse axis at 72. The brackets 70 are suitably mounted on a transverse bulkhead 74 at the base of the tip section 16b. Jack screw 66 and drive shaft 60 are required to swing relatively about a horizontal transverse axis 74. Consequently, as the shaft 60 rotates jack screw 66 accompanying rotation of jack screw 44 in a direction which depresses the nose section 16c from its cruise position shown in FIGURE 1 toward its low-speed flight position shown in FIGURE 2 tip section 16b is swung upwardly in relation to connecting section 16c so as to maintain the tip section substantially parallel with its original position as desired. The reverse action takes place during raising of the nose section 16c. It will be seen, therefore, that in essence the three fuselage sections are interconnected through first and second pivots 26 and 28 that provide the basic articulation joints, and by third and fourth pivots 50 and 72, through coordinating means, that coordinate the relative movements.

While not shown in detail, suitable closure devices and seals are provided at the points between fuselage sections so as to maintain a degree of closure and a substantially faired connection between sections at these joints when displaced from their relative positions in cruise flight. For example, at the joint between the nose sections 16b and 16c an inset cowl 76 projects forwardly from the nose section 16c around the peripheral margin thereof into the interior of the base portion of tip section 16b and moves in sliding contact with suitable sealing elements (not shown) mounted on the interior of the latter around its peripheral edge. Suitable sliding or flexible closure arrangements are also provided at the joint between the main section of fuselage 10 and the nose section 16c.

In the depressed or low-speed flight position of the fuselage nose as shown in FIGURE 2 the substantially parallel relationship between the tip section 16b and the fuselage proper assures that there will be minimum offset of any portion of the nose out of its fuselage-aligned position. Consequently, drag is less than it would be with a straight nose (i.e. unarticulated) of the same length swung downwardly in alignment with the nose section 16c to provide the same increased field of view for the pilot. Such reduction of drag penalty with the articulated nose system comprising this invention derives partly from the smaller frontally projected area of the depressed nose and partly from the more favorable airflow configuration of the articulated form with the tip section remaining parallel with the fuselage proper. Moreover, the effect on trim of the aircraft in flight of moving the articulated nose between positions is materially less than it would be with a straight nose of similar length and shape moved to the same degree. This is due to the fact that in the former case the lift component of the fuselage as a whole is changed only slightly by depression of the articulated nose to its low-speed flight position.

Figure 11:
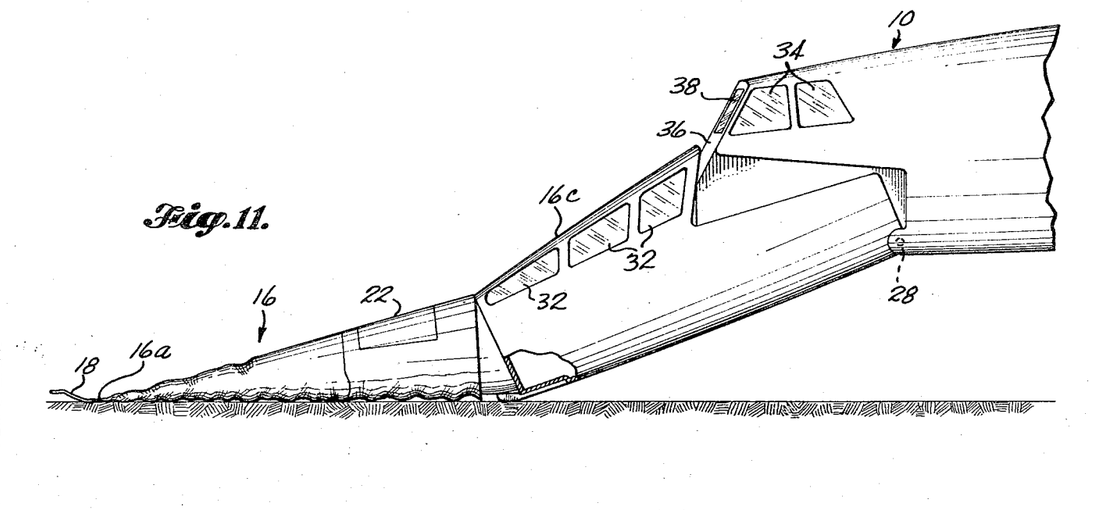
FIGURE 11 is a simplified side view of the nose section of a fuselage skidding on the landing field, as may occur in the event of a front leanding gear failure.

As an additional advantage unique to the articulated nose concept of this invention, should there be a failure of the forward landing gear during landing of the aircraft the depressed nose, and more particularly the tip section thereof, will function as an energy-absorbing ground skid to which most of the damage to the fuselage will be confined as shown in FIGURE 11. Suitable design provisions in the structure of the nose sections 16b and 16c, particularly in the lower framing structures thereof will enable these parts to assume the necessary amount of abrasion and torture during such a landing while supporting the downwardly acting load of the forward portion of the fuselage proper. The load transmission paths between the sections of nose and the fuselage proper is designed to withstand this type of strain without damaging the fuselage. By confining the ground skid contact to the tip of the fuselage, which, in the case of a large supersonic transport airplane, is more than one hundred feet forward of the wings and wing fuel cells, there will be no appreciable danger of rupturing the fuel cells or in the case of rupture, of sparks reaching the fuel to ignite it.

In the normal landing, of course, the aircraft descends along a glide path P—P angled to the runway, such as by an angle of 2½°, with the fuselage axis A—A angled to the glide path by the substantial angle of attack necessary to sustain flight at the relatively low speeds at which landing occurs. With the forward end of the fuselage raised by this increased angle of attack, adequate forward-downward view from the cockpit depends upon depression of the fuselage nose as described. Should for any reason the power driven mechanism which operates the drive unit 48 fail to operate to depress the nose, such apparatus may be made fail-safe so that the nose will drop of its own weight, with suitable energy-absorbing means such as hydraulic or pneumatic dashpots (not shown) provided to limit the downward motion at the correct point without structural damage to the parts. To permit the nose sections to drop in this manner the pitch of jack screws 44 and 46 may be made sufficiently great that the weight of these sections acting on the jack screw 44 will turn the jack screw and thereby turn the shaft 66. Alternatively, a hand-operated crank (not shown) may be connected to the drive unit 48 to operate the same manually in case of a power drive failure.

Figure 7:
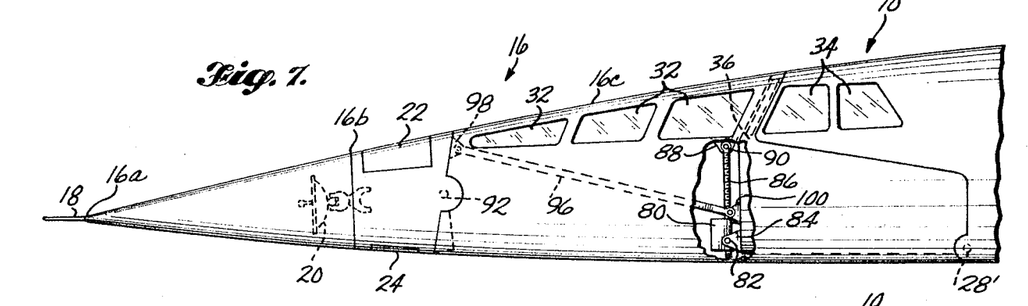
FIGURES 7 and 8 are simplified side views corresponding respectively to FIGURES 1 and 2, but illustrating an alternative linkage mechanism interconnecting and co-ordinating relative movement of the nose sections.
Figure 8:
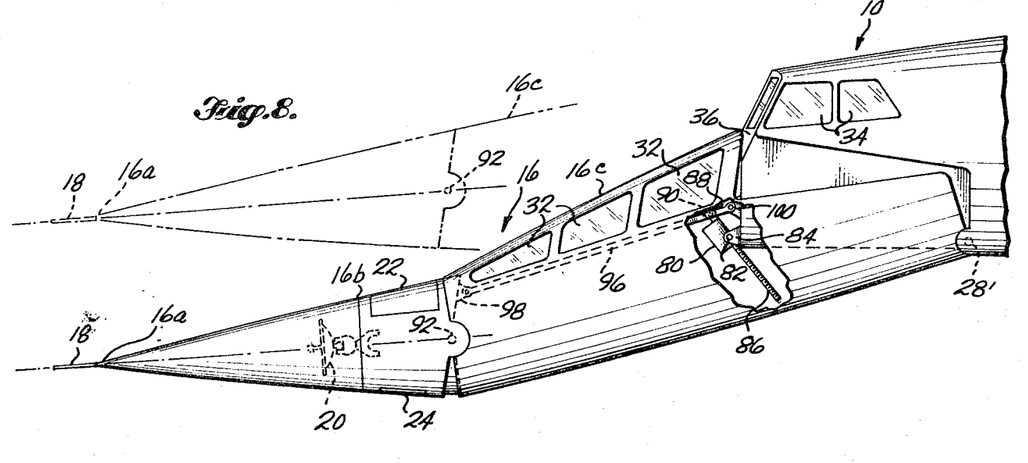

In FIGURES 7 and 8, the modified mechanical linkage arrangement and mechanisms interconnecting the fuselage sections employs a jack screw power drive unit 80 mounted on transversely oriented horizontal pivot 82 in a bracket 84 fixed to the forward bulkhead of the fuselage proper. Drive unit 80 incorporates a nut (not shown) which is motor driven and the threads of which engage the jack screw 86. The latter normally (i.e. in cruise position of the parts) lies in generally upright position just forward of the forward bulkhead of the main section of fuselage 10. The upper end of jack screw 86 is pivotally connected at 90 to a bracket 88 fixed in the nose section 16c. The relative location of the main pivot 28' by which the nose is joined to the main section of fuselage 10 is substantially as in the first described embodiment; however, the connecting pivot between the nose sections 16b and 16c is dropped from the upper portion to approximately a mid-height position 92 as shown. In order to cause upward tilting of tip section 16b relative to the connecting section 16c as the jack screw 86 draws the latter downward about pivot 28' an elongated rigid link 96 pivotally interconnects a bracket 98 fixed on the aft end of tip section 16b near the top thereof, and an opposing bracket 100 fixed on the forward bulkhead of the main section of fuselage 10, preferably at a location slightly above the bracket 84. The relative locations of the pivoted ends of the link 96 and their relationship to the locations of the fuselage pivots 28' and 92 are chosen so as to maintain the tip section 16b substantially parallel to its cruise position (FIGURE 7) as it moves down toward its low-speed flight position (FIGURE 8). Therefore in this embodiment as in that just previously described for fuselage sections are articulatively joined and coordinated through first, second, third and fourth pivotal connections (92, 28' and at the aft and forward ends of the link 96, respectively).

Figure 9:
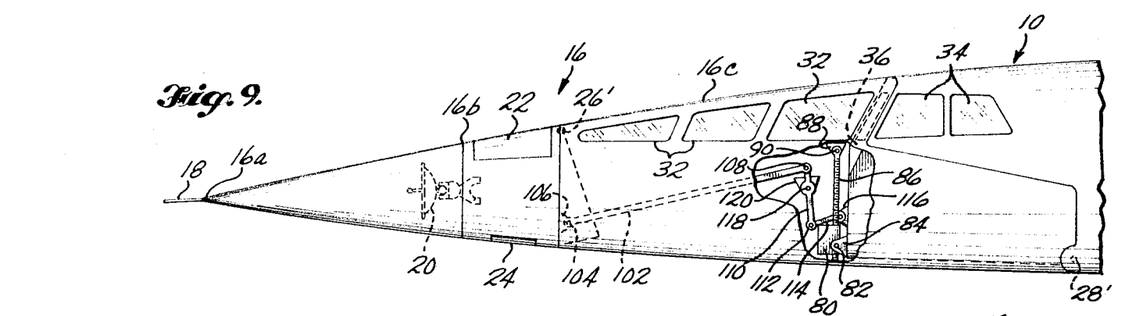
FIGURES 9 and 10 are simplified side views corresponding respectively to FIGURES 1 and 2 illustrating a second alternative mechanical arrangement for controlling relative movement of the nose sections.
Figure 10:
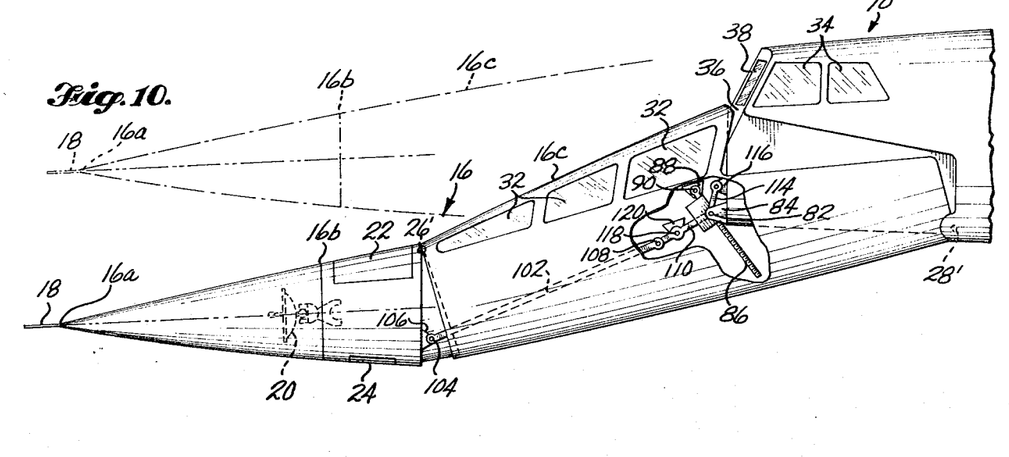

In the second modified linkage and coordinating arrangement for the nose sections shown in FIGURES 9 and 10 the main pivot connection 28' between the nose and the main portion of fuselage is in the same location as in the embodiment of FIGURES 7 and 8, whereas the pivot connection 26' between the nose sections is restored to its position in the first described embodiment (FIGURES 1 and 2). The jack screw 86, its pivotal connection at 90 to the nose bracket 88, the drive unit 80 and its pivotal mount at 82 to the fuselage bulkhead bracket 84 are essentially as shown and described in connection with FIGURES 7 and 8. However, in the present embodiment an elongated rigid link 102 extending generally fore and aft is pivotally connected by its forward end at 104 to a bracket 106 fixed at a relatively low position on the aft bulkhead of the tip section 16b. The aft end of link 102 is pivotally connected at 108 to the upper end of a lever 110. The lower end of this lever is pivotally connected at 112 to a guide link 114, in turn having its opposite end connected pivotally to a bulkhead bracket 116. Lever 110 is pivotally supported at 118 intermediate its ends on a bracket 120 fixed in nose section 16c. With this double link and lever arrangement and the relative positioning of the various pivots of the links and lever as well as of the hinge points for the fuselage sections, articulative downward and upward movement of the nose sections is controlled essentially with the same effect as in the preceding embodiments namely to maintain the tip section 16b substantially parallel to its cruise position as the jack screw 86 is raised and lowered by operation of the power unit 80.

Figure 12:
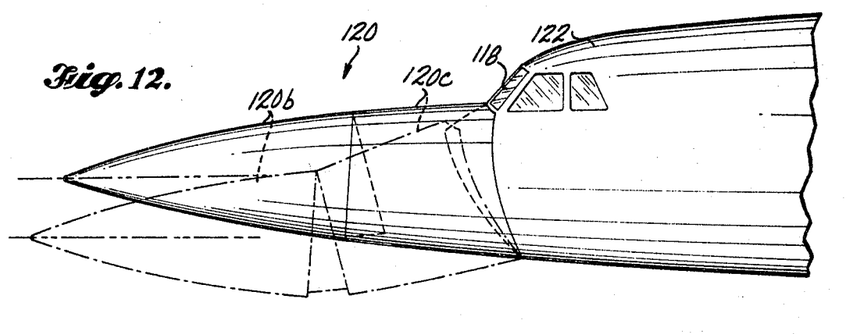
FIGURE 12 illustrates application of the invention in the case of a high-speed aircraft of a subsonic type, wherein the forwardly facing windshield remains exposed to the slipstream in landing as in cruise, but wherein depression of the articulated nose structure in accordance with this invention is employed to open up the pilot's field of forward-downward visibility for landing and take-off purposes.

In the embodiment depicted in FIGURE 12 details of the linkage mechanisms are or may be similar to those previously described and for simplicity are omitted. The purpose of this view is to illustrate that the concept of the invention may be employed in the case of a high-speed subsonic aircraft having a portion of its cockpit, including its forwardly facing cockpit windows 118 exposed at all times to the slipstream as in present-day conventional subsonic jet aircraft. As in preceding embodiments, the articulated nose 120, comprising the forward nose tip section 120b and the connecting or nose base section 120c, is aligned with the main fuselage section 126 when positioned for cruise flight, and is depressed into the dotted-line position in the manner shown when the aircraft is preparing to land or take off.

Figure 13:
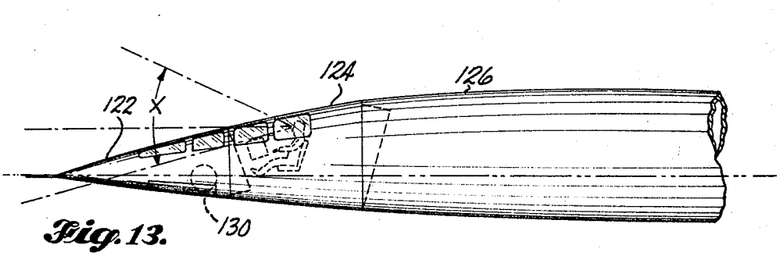
FIGURE 13 is a simplified side view of a modified form of the invention in which the pilot is stationed in a hinged section of the articulated nose which swings downward in relation to the fuselage proper for landing purposes, and in which modified form the front landing carriage is mounted retractably on the tip section of the nose, the view showing the nose sections in the cruise position generally aligned with the fuselage proper.
Figure 14:
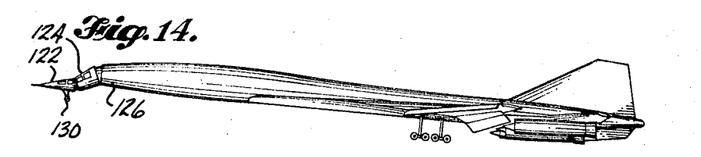
FIGURE 14 is a side elevation view depicting a supersonic aircraft incorporating the arrangement of FIGURE 13 while making a landing approach.
Figure 15:
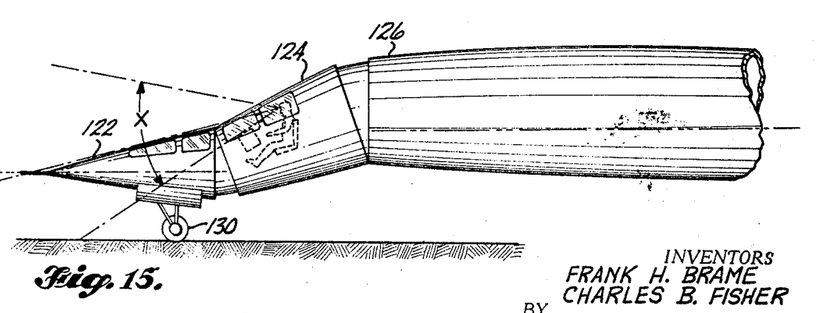
FIGURE 15 is a simplified side view of the nose portion of the modified embodiment shown in FIGURES 13 and 14 as the aircraft stands on the landing field.

In the embodiment shown in FIGURES 13, 14 and 15 the aircraft fuselage again comprises three relatively articulated sections, namely the nose tip section 122, connecting section 124, and main fuselage section 126 hingedly joined, and may be actuated in coordinated manner between the cruise position (FIGURE 13) and low-speed flight position (FIGURE 15) in essentially the same manner as in the preceding embodiments. However, in this case the pilot is stationed in the connecting section of nose, 124, and moves with it as it swings in relation to the main section 120. With the nose raised in supersonic flight, the pilot's angular field of view X in a forward vertical plane is elevated due to the geometry of the nose and the related placement of windows therein. However, in the low-speed flight position when the connecting section 124 is depressed, the frontally-upwardly facing surfaces in which these windows are set, particularly those in the connecting section 124, assume a much steeper forward declination angle and thus swing the field of view X downwardly to a marked extent so as to improve the pilot's vision of the runway. The pilot's seat then may or may not be tilted back to compensate for the declination of connecting section 124. The amount of seat adjustment desired, if any, is a matter of design depending upon pilot preference, aircraft design, loading and flight characteristics (i.e. angle of attack of low-speed flight) as well as upon the relative downward angle to which the connecting section of nose, 124, is depressed for landing purposes. Typically, however, on the landing approach the angle of attack of the aircraft is considerably increased over the angle of attack in cruise, so that if the seat pitch is set at a comfortable level for cruise conditions, when the angle of attack is increased during low-speed flight on making a landing approach this partially offsets the downward tilt of the seat accompanying depression of the connecting fuselage section 124. Therefore the amount of pitch adjustment of the seat to support the pilot comfortably at that time is not as great as might at first be expected.

In his embodiment also, the tip section functions as at support for the forward landing gear 130. In flight this gear is retracted into the tip section conventionally and for landing it is extended. Because the tip section itself is lowered during landings, the landing gear struts may be kept short. Should this landing gear fail to extend the tip section will itself function as an energy-absorbing skid as depicted in FIGURE 11.

These and other features, objects and advantages of the invention will be evident to those skilled in the art on the basis of an understanding of the foregoing description and accompanying illustrations.

What is claimed is:

1. In a high-speed aircraft, an elongated fuselage enclosing a pilot's station having a forwardly facing pilot's viewing window which when unshielded imposes drag penalty by its protrusion into the airstream, said fuselage being divided longitudinally into a series of articulatively interconnected tubular sections including a forward tip section, a main section aft of said tip section, and an intermediately located connecting section normally aligned in faired relationship with said tip and main sections and shielding said window for high-speed flight, means pivoting the connecting section to the main section for downward swinging of the connecting section on a transverse horizontal axis located at a level vertically below said window, whereby, for low-speed flight, the connecting section is tilted downwardly from the main section at an angle of incline to expose the window while the tip section is bodily offset downwardly in relation to the main section, means pivoting the tip section to the connecting section for upward swinging of the tip section relative thereto on a transverse horizontal axis, mechanical movement coordinating means acting on the tip section from another of said sections to tilt the tip section upwardly in relation to the connecting section in conjunction with such tilting downward of the latter relative to the main section, and means to move the tip and connecting sections between such high-speed and low-speed flight positions.

2. The combination defined in claim 1, wherein the mechanical coordinating means comprises a pivotal connection between the connecting section at a forward location thereon and the tip section at an aft location thereon defining a first transverse horizontal pivot axis, a pivotal connection between the connecting section at an aft location thereon and the main section at a forward location thereon defining a second transverse horizontal pivot axis, and control linkage means extending generally longitudinally of the fuselage and having its aft end pivotally connected on a third transverse horizontal pivot axis to the main section at a forward location thereon, and its forward end pivotally connected on a fourth transverse horizontal pivot axis to the tip section at an aft location thereon.

3. The combination defined in claim 2, wherein the control linkage means comprises a rigid link pivotally connected by its ends directly to the tip section and main section, respectively, and wherein the first pivot axis is located above the fourth pivot axis and in approximate fore-and-aft registry therewith, and wherein the second pivot axis is located materially aft of the third pivot axis and in approximate heightwise registry therewith.

4. The combination defined in claim 2, wherein the control linkage means comprises a first rigid link pivotally connected directly by its forward end to the tip section, a second rigid link pivotally connected directly by its rearward end to the main section, and an elongated lever pivotally connected intermediate its ends to said connecting section on a fifth transverse pivot axis, the remaining ends of said first and second rigid links being connected to the respective ends of the lever.

5. The combination defined in claim 2, wherein the control linkage means comprises interengaged screw and nut elements, means to rotate one such element relative to the other so as to advance or retract the screw on the nut, and means pivotally connecting such elements one to the tip section and the other to the connecting section.

6. In a high-speed aircraft, a fuselage structure enclosing a pilot's station at a forward location therein having a forwardly facing pilot's viewing window which when unshielded imposes drag penalty by its protrusion into the airstream, an elongated forwardly tapering nose formed exteriorly to constitute, in high-speed flight position of said nose, a streamlining forward terminus for such fuselage structure shielding said window, said nose comprising a forward tip section of generally tubular form, an aft base section of generally tubular form pivotally connected at its forward end to the tip section and at its after end to the fuselage structure so as to permit lowering of the nose out of its high-speed flight position by downward tilting of the base section in relation to the fuselage structure accompanied by bodily translation movement of the tip section downwardly through a succession of positions substantially parallel to its high-speed flight position, and means to actuate and control the nose sections to effect such movements.

7. In a high-speed aircraft, a fuselage structure enclosing a pilot's station at a forward location therein having a forwardly facing pilot's viewing window which when unshielded imposes drag penalty by its protrusion into the airstream, an elongated forwardly tapering nose formed exteriorly to constitute, in high-speed flight position of said nose, a streamlining forward terminus for such fuselage structure shielding said window, said nose comprising a generally tubular forward tip section, and a generally tubular aft base section pivotally connected at its forward end to the tip section and at its after end to the fuselage structure so as to permit lowering of the nose out of its high-speed flight position by downward tilting of the base section in relation to the fuselage structure accompanied by movement of the tip section to a depressed position downwardly offset from its flight position and in which it is substantially parallel to its high-speed flight position, and means to actuate and control the nose sections to effect such movements.

8. In a high-speed aircraft, an elongated fuselage having a longitudinal axis, said fuselage tapering forwardly substantially uninterruptedly to a tip and including a pilot's station provided with window means through which to provide a forward-downward field of visibility to the pilot which is restricted by the presence of a portion of the fuselage situated forwardly of such station, said fuselage being divided longitudinally into at least three pivotally interconnected succesive tubular sections including an elongated forward tip section located forward of the pilot's station, and operating mechanism by which to depress said tip section by tilting the next adjacent section downward about its aft end in relation to the fuselage section aft thereof, and thereby increase the field of forward-downward visibility through said window, said operating mechanism including means coordinating relative movement of the tip and adjacent sections in such manner that the depressed position of the tip section is substantially parallel to its original position.

9. The combination defined in claim 8, in which the tip section carries at least one instrument which in operation is directionally referenced to said longitudinal axis and is thereby maintained so referenced in either of said positions of the tip section.

10. The combination defined in claim 8, wherein one section of the fuselage incorporates a cockpit in the forward end thereof and has a forwardly facing window set generally transversely across the front end of said one section, and wherein the aforesaid next adjacent section is pivotally connected to said one section to swing downwardly from an initial position of substantial coalignment with said one section covering said window to a depressed position uncovering said window.

11. The combination defined in claim 8, wherein said window is set substantially flush with the top exterior of said next adjacent section at a location extending forward of the pilot's station in the fuselage, and wherein said next adjacent section is so located and moved in relation to the pilot's station during said depression movement of the tip section as to maintain at least a portion of said window situated forwardly of the pilot's station while it swings downwardly into a more steeply sloped attitude relative to said axis.

12. The combination defined in claim 11, wherein the pilot's station is located in said next adjacent section.

13. The combination defined in claim 12, and a retractable landing element carried by the tip section.

14. The combination defined in claim 8 and a retractable landing element carried by the tip section.

References Cited

UNITED STATES PATENTS 3,114,526 12/1963 Morgan ___________ 244—120
3,331,570 7/1967 Kinnerley et al. ______ 244—121

FERGUS S. MIDDLETON, *Primary Examiner.*

THOMAS W. BUCKMAN, *Assistant Examiner.*

U.S. Cl. X.R.

244—121

PO-1050
(5/69)

UNITED STATES PATENT OFFICE
CERTIFICATE OF CORRECTION

Patent No. 3,433,439      Dated March 18, 1969

Inventor(s) Frank H. Brame and Charles B. Fisher

It is certified that error appears in the above-identified patent and that said Letters Patent are hereby corrected as shown below:

Column 1, line 38, (after the Abstract Of The Disclosure) insert the following:

The invention described and claimed herein resulted from work done under a United States Government Contract No. FA-SS-66-5, and the United States Government has an irrevocable, non-exclusive license hereunder to practice and have practiced the invention claimed herein, including the unlimited right to sub-license others to practice and have practiced the claimed invention for any purposes whatsoever.

SIGNED AND
SEALED
APR 7 1970

(SEAL)
Attest:

Edward M. Fletcher, Jr.
Attesting Officer

WILLIAM E. SCHUYLER, JR.
Commissioner of Patents

PO-1050
(5/69)

UNITED STATES PATENT OFFICE
CERTIFICATE OF CORRECTION

Patent No. 3,433,439      Dated March 18, 1969

Inventor(s) Frank H. Brame and Charles B. Fisher

It is certified that error appears in the above-identified patent and that said Letters Patent are hereby corrected as shown below:

Claim 3, line 5 of this claim the word "above" should have been ---below---.

SIGNED AND
SEALED
DEC 22 1970

(SEAL)
Attest:

Edward M. Fletcher, Jr.
Attesting Officer

WILLIAM E. SCHUYLER, JR.
Commissioner of Patents